United States Patent
Maekawa et al.

(10) Patent No.: US 7,227,969 B2
(45) Date of Patent: Jun. 5, 2007

(54) INNER PANEL LOUDSPEAKER APPARATUS

(75) Inventors: Koji Maekawa, Tendo (JP); Tetsuya Onuma, Tendo (JP); Takeshi Ito, Tendo (JP)

(73) Assignees: Pioneer Corporation, Tokyo-to (JP); Tohoku Pioneer Corporation, Yamagata-ken (JP)

( * ) Notice: Subject to any disclaimer, the term of this patent is extended or adjusted under 35 U.S.C. 154(b) by 571 days.

(21) Appl. No.: 10/712,352

(22) Filed: Nov. 14, 2003

(65) Prior Publication Data

US 2004/0120541 A1  Jun. 24, 2004

(30) Foreign Application Priority Data

Nov. 14, 2002  (JP) ............... 2002-330925

(51) Int. Cl.
*H04R 1/02* (2006.01)
*H04R 5/02* (2006.01)
(52) U.S. Cl. ............... 381/345; 381/302; 381/389
(58) Field of Classification Search ............... 181/199; 296/146.5; 381/86, 87, 302, 345, 386, 387, 381/389, 393, 394, 395
See application file for complete search history.

(56) References Cited

U.S. PATENT DOCUMENTS 4,943,109 A * 7/1990 Skrbina et al. .......... 296/146.5
2003/0035563 A1 * 2/2003 Chen .......................... 381/386

FOREIGN PATENT DOCUMENTS

JP  9-37371  2/1997

* cited by examiner

*Primary Examiner*—Curtis Kuntz
*Assistant Examiner*—Brian Ensey
(74) *Attorney, Agent, or Firm*—Young & Thompson

(57) ABSTRACT

A loudspeaker apparatus is provided with a loudspeaker unit attached to an inner panel. The inner panel of the loudspeaker unit is provided with: an opening to which the loudspeaker unit is attached; a volume unit in which the loudspeaker unit is housed from the opening to form a closed space; and a groove passing through to the volume unit. The loudspeaker unit is housed in the volume unit, and a rear space of the loudspeaker unit in the volume unit is used as an acoustic volume unit of the loudspeaker unit.

8 Claims, 2 Drawing Sheets

INNER PANEL LOUDSPEAKER APPARATUS

BACKGROUND OF THE INVENTION

1. Field of the Invention

The present invention relates to the technical fields of an inner panel and a loudspeaker apparatus.

2. Description of the Related Art

In a conventional in-vehicle loudspeaker apparatus, a Helmholtz resonator is arranged so as to suppress an in-vehicle inner panel from being vibrated, and attenuates generated vibration to prevent an unnecessary sound from being produced (for example, see Japanese Patent Application Laid-Open No. 09-37371).

However, in the conventional technique described above, a plurality of Helmholtz resonators must be arranged to absorb sound waves having different frequencies. For this reason, parts increase in number, so that the manufacturing cost disadvantageously increases.

SUMMARY OF THE INVENTION

Accordingly, the present invention is made in consideration of the above-mentioned problems. It is an object to be solved by the present invention to provide an in-vehicle inner panel and an in-vehicle loudspeaker apparatus in which a Helmholtz resonator is structured by devising the shapes and arrangements of parts which have been fitted to a door panel to curbing costs as much as possible.

The present invention will be described below. Although reference numerals in the accompanying drawings will be accessorily written as parenthetic numerals for descriptive convenience, the present invention is not limited to the illustrated features.

The above object of the present invention can be achieved by an inner panel (1) provided with: an opening (2) to which a loudspeaker unit (6) is attached; a volume unit (3) in which the loudspeaker unit (6) is housed from the opening (2) to form a closed space; and a groove (4) passing through to the volume unit (3).

The above object of the present invention can be achieved by a loudspeaker apparatus (SP) in which a loudspeaker unit (6) is attached to an inner panel (1). The inner panel (1) of the loudspeaker unit (6) is provided with: an opening (2) to which the loudspeaker unit (6) is attached; a volume unit (3) in which the loudspeaker unit (6) is housed from the opening (2) to form a closed space; and a groove (4) passing through to the volume unit (3). The loudspeaker unit (6) is housed in the volume unit (3), and a rear space of the loudspeaker unit (6) in the volume unit (3) is used as an acoustic volume unit of the loudspeaker unit (6).

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

An embodiment of an inner panel and a loudspeaker apparatus according to the present invention will be described below by using an in-vehicle inner panel and an in-vehicle loudspeaker apparatus as examples with reference to the accompanying drawings.

Figure 1:
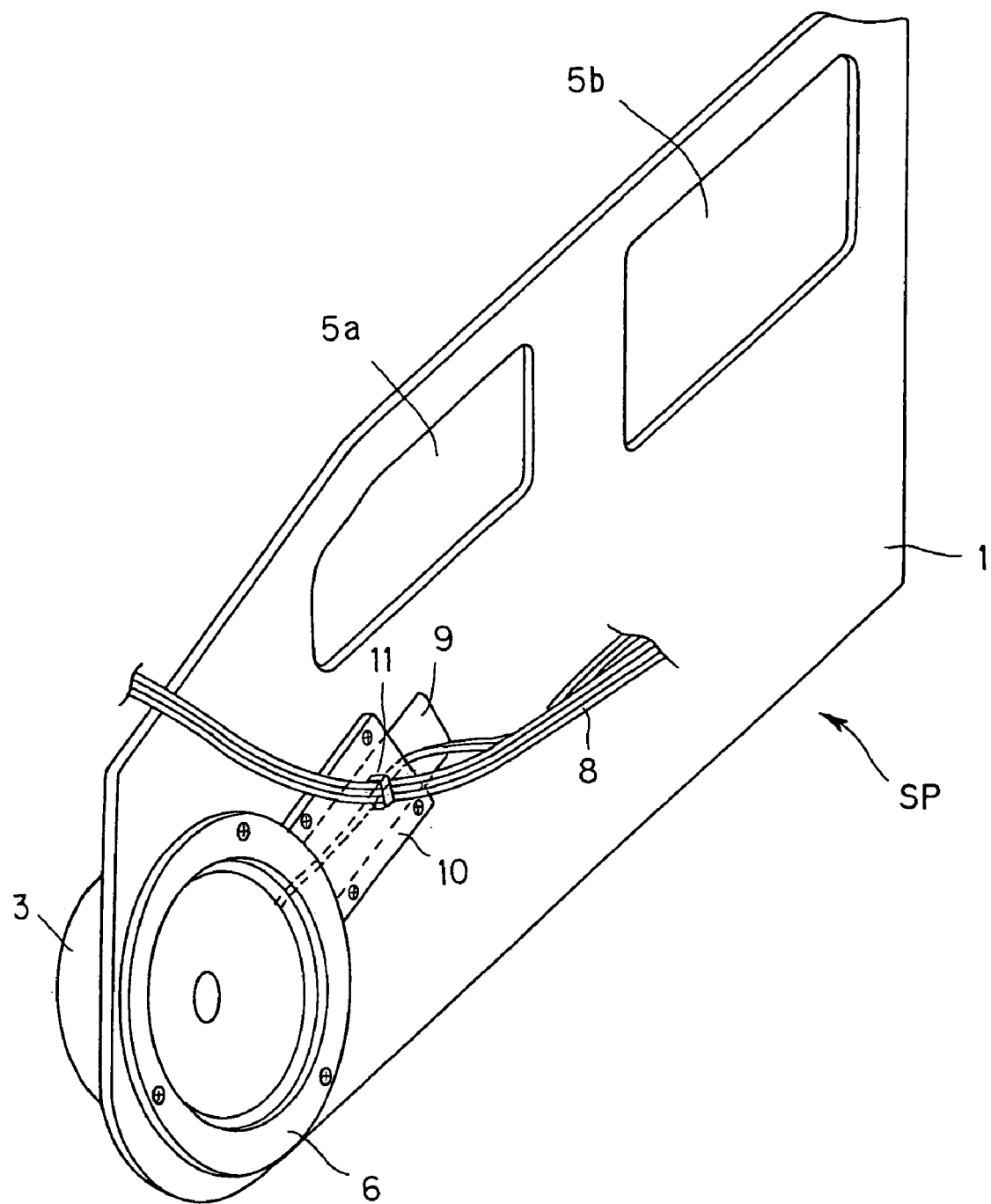
FIG. 1 is a perspective view showing an in-vehicle loudspeaker apparatus SP obtained by attaching a loudspeaker unit 6 to an in-vehicle inner panel 1 according to an embodiment of the present invention.
Figure 2:
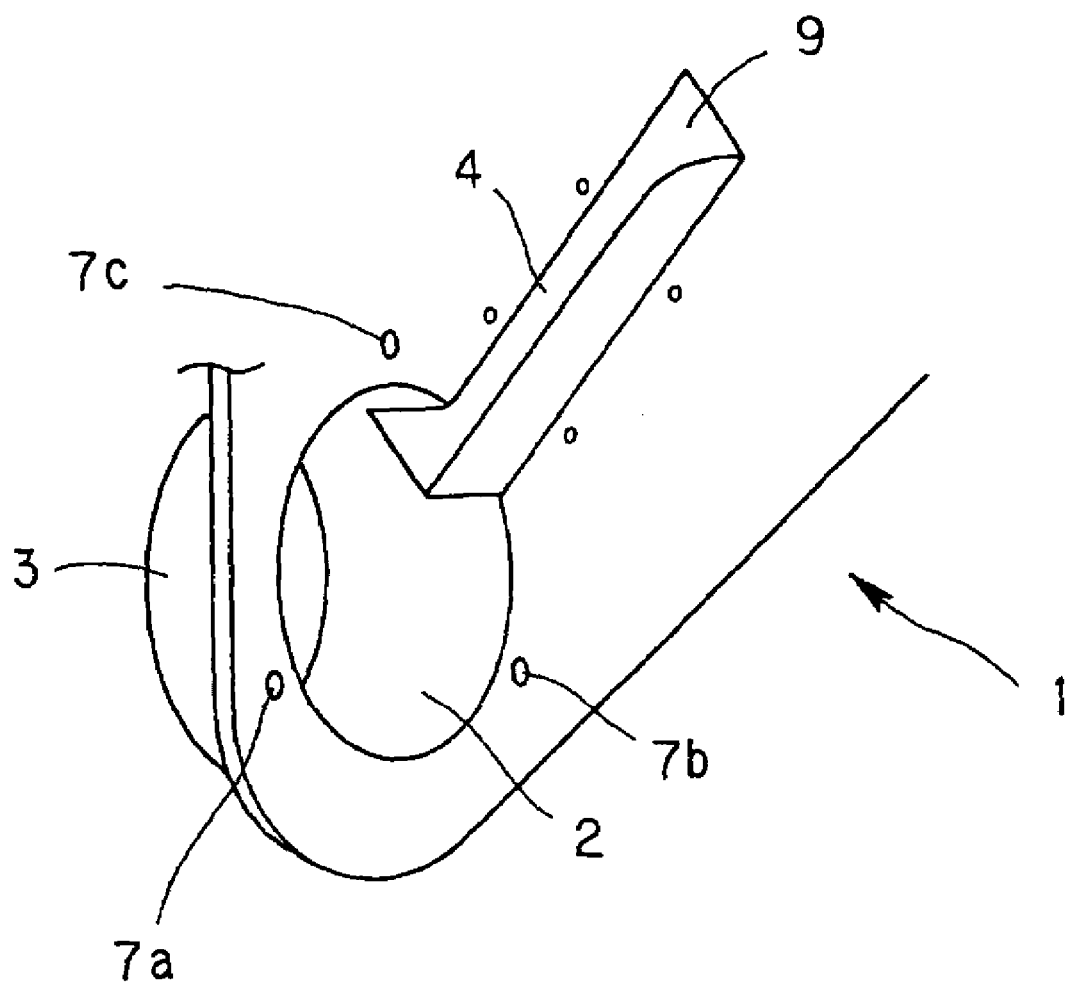
FIG. 2 is a perspective view showing the in-vehicle inner panel 1 to which the loudspeaker unit 6 has not been attached in the embodiment of the present invention.

FIG. 1 is a perspective view showing an in-vehicle loudspeaker apparatus SP obtained by attaching a loudspeaker unit 6 to an in-vehicle inner panel 1 according to an embodiment of the present invention, and FIG. 2 is a perspective view showing a part of the in-vehicle inner panel 1 to which the loudspeaker unit 6 has not been attached in the embodiment of the present invention.

In general, an in-vehicle door has a double structure to hold a window glass, and interiorly comprises an in-vehicle inner panel to which a window glass elevating mechanism is attached so as to ascent and descent the window glass. In this case, the in-vehicle inner panel has a hole called a service hole formed therein while securing the strength of the inner panel for maintenance or a light-weight door.

The in-vehicle inner panel 1 according to the embodiment of the present invention comprises an opening 2 to which the loudspeaker unit 6 is attached, a housing unit 3 for housing the loudspeaker unit 6, and a groove 4 connected to the housing unit 3. In addition, the in-vehicle inner panel 1 has service holes 5a and 5b.

The opening 2 has a size which is enough to house the loudspeaker unit 6 therein, and screw holes 7a, 7b, and 7c for fixing the loudspeaker unit 6 are formed around the opening 2. The peripheral surface of the opening 2 with which a gasket (not shown) of the loudspeaker unit 6 is in contact is a smooth surface to prevent air current before and after the loudspeaker unit 6.

The housing unit 3 houses the loudspeaker unit 6 and has an acoustic volume unit in a rear space of the loudspeaker unit 6. This acoustic volume unit functions as an acoustic compliance to prevent the loudspeaker from moving. More specifically, when the acoustic volume unit is large, a reproduction limit is controlled by the lowest resonance frequency of the loudspeaker. When the acoustic volume unit is small, the reproduction limit is controlled by the acoustic compliance. Therefore, the volume (depth) of the housing unit 3 is determined within such a range that the reproduction limit of the loudspeaker does not give uncomfortable feeling to an audience. Furthermore, the housing unit 3 has no rear hole to prevent raindrops out of the upper window glass (not shown) and to prevent a sound out of the back of the loudspeaker unit 6 from discharging into the door panel.

The groove 4 has such a size (width and depth) that the groove 4 functions as a sound tube through a wire harness 8. A lid 10 is attached such that an end portion 9 is open, thereby structuring a tube unit. This end portion 9 of the tube unit is arranged at such a position that the end portion 9 is not closed when the in-vehicle inner panel 1 is attached to the door panel. A fixing clamp 11 for fixing the wire harness 8 of the loudspeaker unit 6 is attached to the lid 10.

The in-vehicle inner panel 1 consists of, for example, a resin or a complex resin such as FRP (fiberglass reinforced plastics), and is manufactured by integral molding.

For example, the in-vehicle loudspeaker apparatus SP according to this embodiment constitutes the loudspeaker apparatus according to the present invention, the in-vehicle inner panel 1 constitutes the in-vehicle inner panel according to the present invention, the opening 2 constitutes the opening according to the present invention, the housing unit 3 constitutes the housing unit according to the present invention, the groove 4 constitutes the groove according to the present invention, and the fixing clamp 11 constitutes the fixing unit according to the present invention.

A phenomenon occurring when the in-vehicle loudspeaker apparatus SP having the above configuration produces a sound will be described below.

When the loudspeaker unit 6 receives an audio signal to produce a sound, the sound produced from a diaphragm in the loudspeaker is propagated ahead of the loudspeaker, and a sound in opposite phase is propagated to the rearward of the loudspeaker.

Since the loudspeaker unit 6 according to this embodiment is housed in the housing unit 3 of the in-vehicle inner panel 1, the sound propagated to rearward of the loudspeaker is closed in the acoustic volume unit without being spread to the inner space of the door panel. As a result, the vibration of the door panel also decreases.

The resonance of Helmholtz will be described below.

It is generally known that a characteristic frequency v [Hz] of a resonance of a vessel having a shape obtained by connecting, to a trunk portion having a slightly large volume such as a medicine bottle, a tube (neck) which is thinner and shorter than the trunk portion is given by the following equation:

$$v = \frac{c}{2\pi}\sqrt{\frac{S}{(\Delta + V)}} \qquad \text{(Equation 1)}$$

where the volume of the trunk is represented by V [m³], the sectional area of the neck is represented by S [m²], the length of the neck is represented by l [m], and a speed of sound is represented by c [m/s], and reference numeral Δl denotes correction of an opening end of the neck portion. When the significant radius of the neck portion is represented by a, Δl=1.5a to 1.7a is satisfied.

As is apparent from (Equation 1), when a vessel has no neck portion (l=0) and a hole formed in the trunk portion, the vessel functions as a resonator. More specifically, the housing unit 3 according to this embodiment functions as a resonator which uses the groove 4 connected to the housing unit 3 as an opening end and which has no neck portion. A characteristic frequency $v_1$ [Hz] of a resonance of the resonator is given by the following (Equation 2) obtained by transforming (Equation 1).

$$v_1 = \frac{c}{2\pi}\sqrt{\frac{S_1}{\Delta \cdot l \, V}} \qquad \text{(Equation 2)}$$

where $S_1$ [m²] is a sectional area of the trunk.

As is apparent from (Equation 2), the characteristic frequency $v_1$ obtained when the housing unit 3 functions as a resonator can be regulated by controlling a sectional area $S_1$ and a volume V of the trunk.

The groove 4 constitutes an acoustic tube, more specifically, a Helmholtz resonator by a combination of the housing unit 3 and the groove 4. A characteristic frequency $v_2$ [Hz] of the resonance is given by (Equation 3) which is similar to (Equation 1):

$$v_2 = \frac{c}{2\pi}\sqrt{\frac{S}{(\Delta + V)}} \qquad \text{(Equation 3)}$$

As is apparent from (Equation 3), the characteristic frequency $v_2$ of the Helmholtz resonator constituted by the housing unit 3 and the groove 4 can be regulated by controlling a volume V of the trunk, a sectional area S, and a length l of the neck.

Since the housing unit 3 is a closed space having a small airflow, the groove 4 connected to the housing unit 3 sympathetically vibrates. The groove 4 has a resonance frequency when both the ends of the groove 4 are open and a resonance frequency when one end on the housing unit 3 side is closed. The resonance frequencies in a low-frequency band include a resonance frequency $v_3$ [Hz] obtained when both the ends are open, a resonance frequency $v_4$ [Hz] of the first harmonic obtained when one end is open, and a resonance frequency $v_5$ [Hz] of the third harmonic. These frequencies are obtained by the following (Equation 4):

$$\left.\begin{array}{l}\text{resonance frequency of a both-end-open tube} \quad v_3 = \dfrac{c}{2} \\[6pt] \text{resonance frequency of first harmonic of one-end-open tube} \quad v_4 = \dfrac{c}{4} \\[6pt] \text{resonance frequency of first harmonic of one-end-open tube} \quad v_5 = \dfrac{3}{4}\end{array}\right\} \quad \text{(Equation 4)}$$

As is apparent from (Equation 4), the resonance frequencies $v_3$, $v_4$, and $v_5$ can be regulated by controlling the length l of the neck.

Therefore, the resonance frequencies $v_1$ and $v_2$ of the Helmholtz resonator and the resonance frequencies $v_3$, $v_4$, and $v_5$ of the acoustic tube can be regulated by controlling the shapes of the housing unit 3 and the groove 4, so that a vibration sound can be suppressed from being produced in a continuous band.

The materials, thicknesses, shapes, and the like of door panels or attached positions of loudspeakers vary depending on the types of vehicles, and vibration strengths vary depending on the types of vehicles. Therefore, the shape (length) and the attached position of the groove 4 are calculated by an experiment every type of vehicle.

The embodiment has the following advantages.

A sound having a low frequency ranging from 50 Hz to 200 Hz of vibrations which give uncomfortable feeling to an operator can be suppressed by the in-vehicle inner panel 1 and the in-vehicle loudspeaker apparatus SP, so that uncomfortable feeling which is received by the operator can be reduced.

A vibration sound in a continuous band can be suppressed from being produced by the resonance frequency $v_1$ of a Helmholtz resonance in the housing unit 3, the resonance frequency $v_2$ of a Helmholtz resonance caused by a combination of the housing unit 3 and the groove 4, and the characteristic frequencies $v_3$, $v_4$, and $v_5$ of resonances produced by the groove 4.

The resonance frequency $v_1$ of a Helmholtz resonance in the housing unit 3 can be regulated by regulating the sectional area $S_1$ and the volume V of the housing unit 3, the resonance frequency $v_2$ of a Helmholtz resonance caused by a combination of the housing unit 3 and the groove 4 is regulated by the volume V of the housing unit 3 and the sectional area S and the length l of the groove, and the characteristic frequencies $v_3$, $v_4$, and $v_5$ of resonances produced by the groove 4 are regulated by regulating the length l of the groove 4.

Since the rear surface of the loudspeaker unit 6 is housed in the housing unit 3, a sound propagated to the rearward of the loudspeaker unit 6 does not spread to the inner space of the door panel. As a result, vibration of the door panel can be reduced.

The embodiment is not limited to the above description, and may be modified as follows.

The frame portion of the loudspeaker unit 6 may be designed to cover the groove 4 such that the end portion 9 of the groove 4 is open. Since the lid 10 serving as an independent part is omitted, costs for attaching the part, managing the part, and the like can be saved.

A sound absorbing material may be arranged in the housing unit 3. Reverberant feeling caused by stationary wave can be reduced, and more faithful reproduction can be obtained.

The loudspeaker unit 6 may be fixed not only by screws but also by adhesion, a leaf spring, or a hook. The airtightness of the loudspeaker unit 6 may be secured by not only a gasket but also coating of a sealing agent. The lid 10 may be fixed by not only screws but also adhesion or a hook.

In an embodiment of an inner panel and a loudspeaker apparatus according to the present invention, the present invention has been described by using the in-vehicle inner panel 1 and the in-vehicle loudspeaker apparatus SP as examples. However, the present invention is not limited to the in-vehicle inner panel 1 and the in-vehicle loudspeaker apparatus SP. The present invention can be applied to any structure in which a loudspeaker unit is attached to an inner panel. For example, the present invention can be applied to a panel for a motorbike or a door panel for a transportation device such as a door panel for a ship.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-330925 filed on Nov. 14, 2002 including the specification, claims, drawings and summary is incorporated herein by reference in its entirety.

What is claimed is:

1. An inner panel comprising:
   an opening to which a loudspeaker unit is attached;
   a volume unit in which the loudspeaker unit is housed from the opening to form a closed space; and
   a groove passing through to the volume unit,
   wherein a Helmholtz resonance is generated by the groove and the volume.

2. The inner panel according to claim 1, wherein the groove is covered with a lid such that an end portion of the groove is open.

3. The inner panel according to claim 2, wherein a fixing unit for fixing a wire harness of the loudspeaker unit is attached to the lid.

4. A loudspeaker apparatus in which a loudspeaker unit is attached to an inner panel, wherein
   the inner panel comprises:
   an opening to which the loudspeaker unit is attached;
   a volume unit in which the loudspeaker unit is housed from the opening to form a closed space; and
   a groove passing through to the volume unit,
   the loudspeaker unit is housed in the volume unit, and
   a rear space of the loudspeaker unit in the volume unit is used as an acoustic volume unit of the loudspeaker unit,
   wherein a Helmholtz resonance is generated by an acoustic mass constituted by an inner space of the groove and a volume held by the acoustic volume unit.

5. The loudspeaker apparatus according to claim 4, wherein the groove is covered with a lid such that an end portion of the groove is open.

6. The loudspeaker apparatus according to claim 5, wherein the lid is comprised of a frame portion of the loudspeaker unit such that the end portion is open.

7. The loudspeaker apparatus according to claim 5, wherein a fixing unit for fixing a wire harness of the loudspeaker unit is attached to the lid.

8. The loudspeaker apparatus according to claim 6, wherein a fixing unit for fixing a wire harness of the loudspeaker unit is attached to the lid.

* * * * *